United States Patent [19]

Müller et al.

[11] 4,360,092
[45] Nov. 23, 1982

[54] GEARSHIFT METHOD AND APPARATUS

[75] Inventors: Alfred Müller, Leonberg; Joseph Sauer, Schwieberdingen, both of Fed. Rep. of Germany

[73] Assignee: Robert Bosch GmbH, Stuttgart, Fed. Rep. of Germany

[21] Appl. No.: 128,522

[22] Filed: Mar. 10, 1980

[30] Foreign Application Priority Data

Apr. 6, 1979 [DE] Fed. Rep. of Germany ....... 2913824

[51] Int. Cl.³ ...................... F16D 67/04; F16H 57/10
[52] U.S. Cl. ................................... 192/12 C; 74/786; 74/787; 192/13 R; 192/17 A
[58] Field of Search ................. 192/12 C, 17 A, 17 D, 192/13 R, 0.034, 4 A; 74/787, 786, 752 A

[56] References Cited

U.S. PATENT DOCUMENTS

| 2,409,506 | 10/1946 | McFarland | 192/12 C X |
| 3,572,177 | 3/1971 | Ishihara | 192/12 C |
| 4,216,852 | 8/1980 | Ushijima | 192/56 F X |
| 4,225,029 | 9/1980 | Ushijima | 192/12 C |

*Primary Examiner*—Rodney H. Bonck
*Attorney, Agent, or Firm*—Frishauf, Holtz, Goodman & Woodward

[57] ABSTRACT

In first gear, a brake band prevents one gear of the planetary gearing of an automatic transmission from rotating. In second gear, a clutch causes this gear to rotate as a unit with the drive and driven shaft of the transmission. For an upshift under load, the clutch is engaged slowly, thereby decreasing the required brake torque. The brake force is therefore decreased at a corresponding rate. A switch having a movable contact is mounted so that the contact is moved in response to the reactive force created between the brake band and the gear box. This reactive force varies as a function of the brake force and also depends upon the direction of movement of the braked member. The switch is set to a threshold value which is substantially less than the brake force applied in first gear. At the freewheel point, that is the point at which the moment of the brake member changes direction, the brake force has been decreased sufficiently that the change in direction of the moment will cause the switch to pass the threshold value thereby generating a signal. This signal is processed to cause full disengagement of the brake. The switch will also pass the threshold value when, after complete disengagement of the brake, a change in direction of moment of the member occurs. At this point the brake is fully engaged in a downshift under load.

1 Claim, 8 Drawing Figures

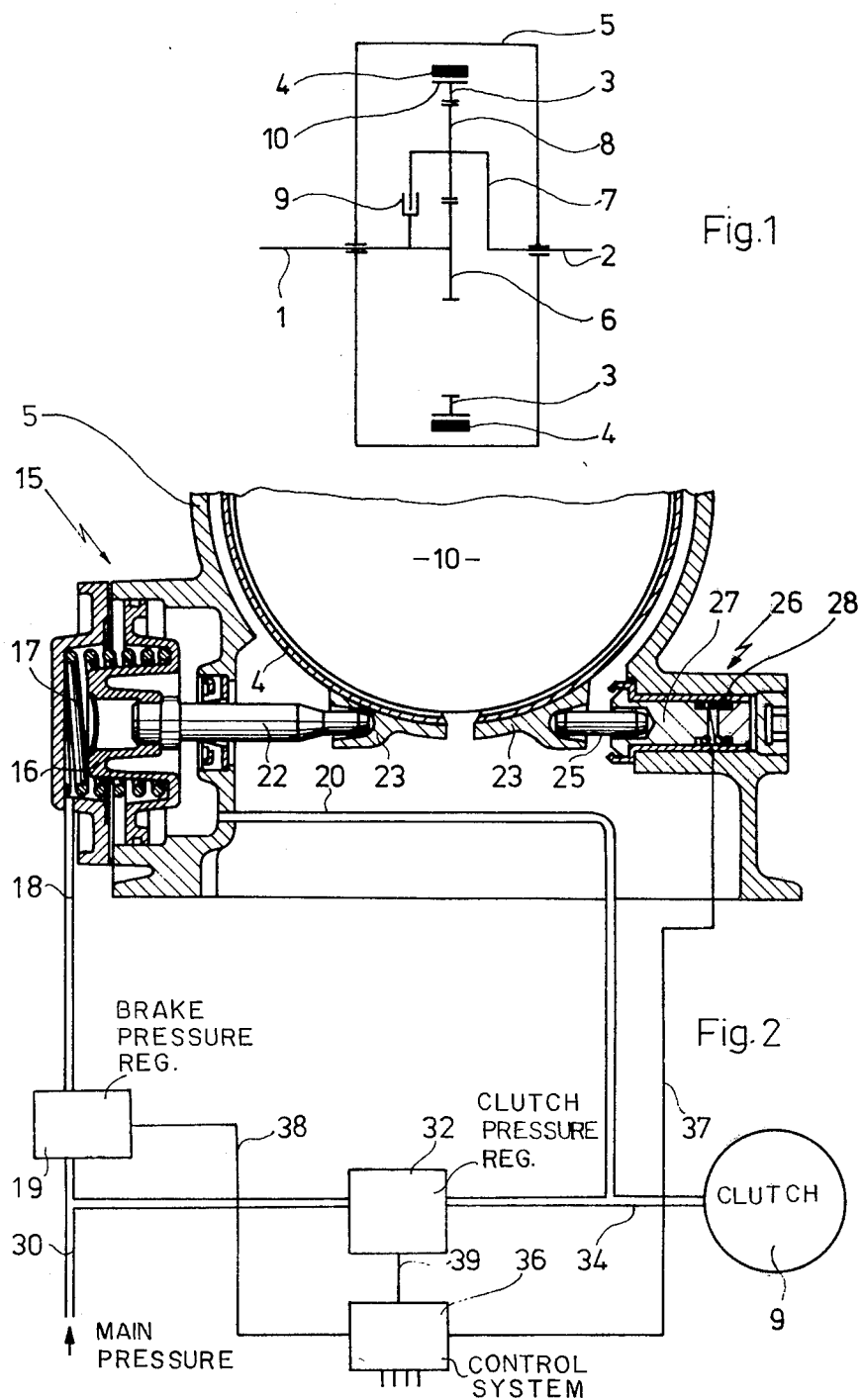

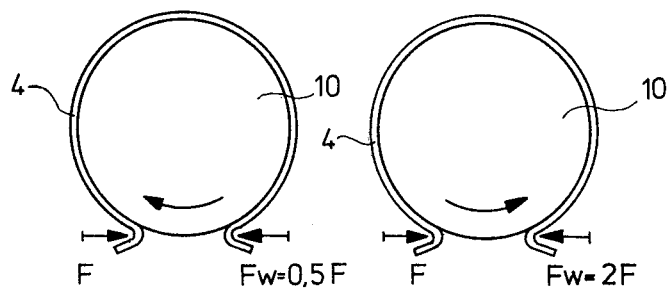
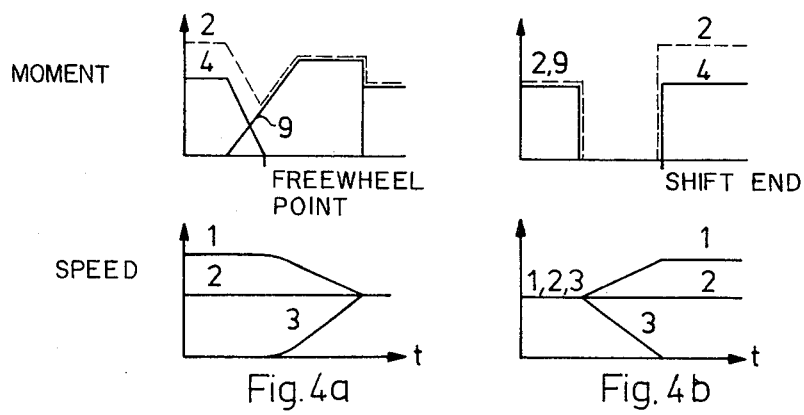
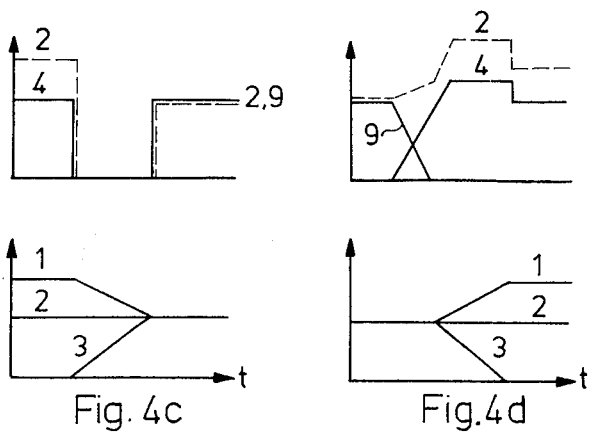

GEARSHIFT METHOD AND APPARATUS

The present invention relates to a method and apparatus for generating a signal when an element in the planetary gearing of an automatic transmission is about to change direction of rotation. Specifically, the change in direction of rotation occurs when the transmission is switched from first gear operation, in which the abovementioned element is prevented from rotation by the application of a maximum brake force, to second gear operation wherein a previously disengaged clutch is engaged causing the previously braked member to rotate with the drive and driven shaft of the transmission. In changing gears from first to second gear or shifting down from second to first gear in such automatic transmissions in a motor vehicle, it is desirable to prevent jolts which would make the ride uncomfortable and cause damage and undesired losses in the various drive and switching elements. For this purpose, in known apparatus, the torque transmission is temporarily interrupted, i.e. the braking force is either completely eliminated or substantially decreased and the coupling is disengaged. This interruption of torque transmission is not necessary for upshifts under load or downshifts while coasting. Under these conditions it is necessary to determine exactly when certain conditions in the planetary gearing exist so that the shift processes can be initiated at just the right instant so that a minimum jolt results. In the known transmission it is possible to determine the exact timing of the shift end, that is the time at which, following disengagement of the clutch, the element to be braked has come to rest prior to being accelerated in the opposite direction of rotation. During shift down under load, the brake is to be engaged at exactly this time to prevent further rotation of this member. In the known equipment, the brake band is completely disengaged from the member to be braked during operation in second gear, but shortly before the shift end a very small force is applied to the brake band, this force being of such a magnitude that the exact point at which the member to be braked has ceased rotating just prior to reversing its direction of rotation can be determined by a sudden change in reactive force exerted on a sensor. This known equipment does not allow determination of the freewheel time, which will be defined below.

THE INVENTION

According to the present invention, a sensor is provided, such as a switch having a movable contact. The sensor is braced against the gearbox and the brake band in such a way that the force exerted on the movable contact depends both upon the force exerted on the brake band at the other end and the direction of rotation of the member being braked (herein referred to as the first member). The switch furnishes a threshold signal when the force applied thereto exceeds a predetermined threshold value. In first gear, full brake force is applied to the brake band causing the reactive force applied to the sensor to exceed the threshold value. During gearshift, the clutch is engaged at a predetermined rate, thereby decreasing the moment exerted by the first member. Simultaneously the brake force is applied at such a rate that the rotating member remains stationary. At the freewheel point, namely at the point where the rotating member would change direction of rotation, the brake force has decreased sufficiently that the change in reactive force when the braked member attempts to change its direction of rotation causes the sensor to furnish the threshold signal. This threshold signal thus constitutes the freewheel signal, that is a signal indicative of the fact that the previously braked member is about to start rotating in the opposite direction in which it would have rotated had it not been braked. Before this point is reached, the brake should not be completely released, because otherwise a jolt would result. It should be released at exactly this point or, in some cases, a relatively short time thereafter. In any case, after release, the brake band should be lifted away from the member being braked as much as possible to prevent unnecessary friction losses.

It should be noted that if, during upshift under load, the brake force exerted on the first member would be immediately decreased to the minimum brake force at the freewheel point, then the torque exerted by the brake would not be sufficient to prevent rotation of the first member. However, in the method according to the invention, the brake moment is always sufficient to stop the first member from rotating. If, on the other hand, the brake force would not be described at all, then the sensor would not respond to a change in direction of rotation of the first member since the brake force results in a reactive force which greatly exceeds the threshold of the sensor. In this type of operation it would thus be impossible to determine the freewheel point. This is only possible because of the simultaneous increase in clutch engagement and decrease in brake force which is specified by the method of the present invention and carried out by the equipment thereof.

In other known equipment, the wheel of the planetary gearing which constitutes the first member is coupled to a freewheel and therefore may be rotated in one direction only. However, such a freewheel is expensive and, in conjunction with this equipment, an additional brake must be used if the braking power of the engine is to be utilized in first gear during steep descent of the vehicle.

DRAWINGS ILLUSTRATING A PREFERRED EMBODIMENT

FIG. 1 is a schematic diagram of a transmission;

FIG. 2 is a simplified diagram of the transmission according to the present invention and the associated control system;

FIGS. 3a and 3b illustrate the forces applied at the ends of the brake band for different directions of rotations of the member to be braked; and FIGS. 4a-4d illustrate the available torque and the speed of different parts of the transmission during different downshift and upshift conditions.

A two-speed automatic transmission is shown in FIG. 1. It has a drive shaft 1 which is, for example, coupled to a torque converter (not shown) and an output or driven shaft 2. The transmission is a planetary gearing having an outside wheel 3 which can be stopped from rotation relative to a gear box 5 by application of a brake band 4. Drive shaft 1 is coupled to the sun wheel of the gearing, while shaft 2 is coupled to a cage 7 which carries planetary gears 8 which are coupled to outside wheel 3. A clutch 9, when engaged, prevents relative rotation of cage 7 and drive shaft 1. For preventing the rotation of wheel 3, brake band 4 cooperates with a brake drum 10.

Of the parts shown in FIG. 1, only brake band 4, brake drum 10 and a part of gear box 5 are shown in FIG. 2. The elements cooperating with brake band 4 are also illustrated, and clutch 9 is symbolically indicated. An activating apparatus 15 is rigidly coupled to gear box 5. Activating apparatus 15 includes a hydraulically activable piston 16 which is prestressed in the direction pointing to the right in FIG. 2 by a spring 17. A pressure medium, and more specifically a hydraulic fluid, can be applied to the left side of piston 16, herein referred to as the activating side, by means of a pipe 18. The pressure in pipe 18 is controlled by a regulator 19. A pressure medium may be applied to the right side of piston 16, that is the release side, through a pipe 20. Piston 16 activates a connecting member 23 which is fastened to one end of the brake band via a rod 22. Brake band 4 almost completely surrounds brake drum 10. This is not fully shown in FIG. 2, the upper part of brake drum 10 being omitted for the purposes of clarity. However, it is illustrated in FIGS. 3a and 3b. A similar connecting member 23 is connected to the other end of brake band 4. A tripping pin 25 of an electrical switch 26 engages the second connecting member 23. Switch 26 also includes a movable contact 27 which is biased by a spring 28 in the direction pointing to the left in FIG. 2. The activating apparatus 15 and switch 26 are rigidly connected to gear box 5. It should also be noted that brake band 4 may be wound several times around brake drum 10.

The input side of pressure regulator 19 receives a pressure medium (main pressure) through a pipe 30. The same pressure medium is also applied to the input of a pressure regulator 32 for clutch 9. The output side of the latter is connected through a pipe 34 to the shift input of clutch 9 and is also connected to pipe 20. Thus, the pressure of the pressure medium applied to the release side of the activating apparatus is the same as that applied to the activating input of clutch 9.

An electrical control stage 36 is connected through a line 37 to switch 26 and is also connected through electrical lines 38 and 39 to pressure regulator 19 and 32, respectively. Further electrical inputs leads are indicated in FIG. 2, but these are of no interest relative to the present invention.

If brake band 4 is fully tightened and drum 10 is driven in the clockwise direction in FIG. 2, then the tangential force F applied to the left connecting member 23 is related to the force applied to the righthand connecting member 23 according to the following equation:

$$Fw = Fe^{-\mu a},$$

where $\alpha$ is the angle for which brake band 4 surrounds brake drum 10 in radians and $\mu$ is the coefficient of friction. For $\mu = 0.12$ and $\alpha \approx 330° e^{-\mu a} = 0.5$.

For the reverse direction of torque exerted by brake drum 10 (see FIG. 3b) the following equation applies:

$$Fw = Fe^{+\mu a};$$

for the numbers given above, $e^{+\mu a} = 2$.

Thus, if the force F exerted by the activating apparatus remains constant, a change in direction of the torque exerted by brake drum 10 causes an appreciable change in the force Fw applied to the rightmost connecting member 23. If, for this change in force, the threshold value for which the tripping pin of switch 26 changes its position is passed, then switch 26 will furnish a signal which indicates the change in direction of torque of brake drum 10.

If the transmission is in first gear and therefore brake band 4 is fully tightened, pressure medium being applied to the activating side of the activating apparatus 15, the force F is so great that the tripping pin of switch 26 is always in the rightmost end position in FIG. 2. Brake drum 10 tries to turn in the counterclockwise sense (FIG. 3b) but is, however, restrained by brake band 4. Even if a change in direction of torque of brake drum 10 should occur, switch 26 would not respond, since tripping pin 27 would stay in its rightmost end position.

When, however, second gear is engaged, clutch 9 is fully engaged so that a sufficiently high pressure is applied through pipe 20 to the release side of activating apparatus 15 to force piston 16 into its leftmost end position in opposition to the force of spring 17. Brake band 4 is therefore lifted from brake drum 10 to a sufficient extent that almost no braking results. Under these conditions, brake drum 10 will turn in the clockwise direction in the view shown in FIG. 2, and tripping pin 27 will be in its leftmost end position.

Referring now to FIGS. 4a through 4d, the upper portion of each of these figures indicates which torques are applied to the brake and to the clutch and which output torques are available, while the lower portions illustrate the rotational speed variation of drive shaft 1, output shaft 2 and outside wheel 3. The horizontal axis is, in every case, the time axis.

In FIG. 4a, an upshift from the first to second gear under load is illustrated, in FIG. 4b a downshift under load, in FIG. 4c, an upshift while coasting, and in FIG. 4d, a downshift while coasting.

For a downshift under load (FIG. 4b), coupling 9 is first disengaged. In second gear, shaft 1, shaft 2, and outside wheel 3 all rotate at the same speed. When clutch 9 is disengaged, the speeds of these elements start to differ from each other. The rotational speed of wheel 3 decreases and the moment at which it reaches the value of zero is herein referred to as the brake engage point, that is the point at which brake 4 is to be engaged. If brake 4 would not be engaged, wheel 3 would be accelerated in the opposite direction. During the time in which neither the clutch nor the brake is engaged, no pressure medium is applied to either the activating side or the release side of activating apparatus 15. The net force applied to rod 22 is therefore that of spring 17 which pushes it towards the right to an extent which is sufficient to cause brake band 4 to slip lightly against brake drum 10. For a particular embodiment, this force F is 300 N. As soon as brake drum 10, which is rigidly coupled to outside wheel 3, has come to rest, or at the latest at the moment in which it just starts to turn in the opposite direction, tripping pin 27 of switch 26 which is biased by a force of 300 N by spring 28 changes its position. This change in position causes switch 26 to furnish a signal through line 37 to control stage 36. This in turn causes the brake to be completely engaged, preventing any rotation of brake drum 10. In the example shown here, rod 22 is pushed with a force of approximately 5,000 N towards the right to effect this complete engagement of the brake.

For an upshift under load (FIG. 4a) only the brake is at first engaged. To start the upshift, the pressure in line 34 is increased slowly by pressure regulator 32 as illustrated in the upper portion of FIG. 4a. Simultaneously, the same slowly increasing pressure is applied to the release side of the activating apparatus 15 and, since it opposes the pressure applied at the activating side, causes the maximum torque which may be transmitted from brake band 4 to brake drum 10 to decrease at exactly the same rate as the torque applied to clutch 9 is increased. However, the braking moment is still sufficiently high that drum 10 is prevented from rotating. The reduction of the braking moment is possible because the torque taken over by the clutch decreases that effective at outside wheel 3. The time instant at which the torque applied to outside wheel 3 and therefore to brake drum 10 is zero is the free-wheeling point and at this point, or possibly slightly later, the brake is to be completely released so that outside wheel 3 can turn freely and in the opposite direction in which it would turn if, for an engaged first gear, brake band 4 were not tightened. Since, at the latest shortly before the freewheeling point, the force exerted by rod 22 onto brake band 4 has decreased sufficiently that switch 26 would respond to a reversal of direction of the turning moment of brake drum 10, the free-wheel point is always reliably determined. In the illustrative embodiment the arrangement is such that, at approximately the free-wheel point, the force exerted by rod 22 on brake band 4 is determined only by the force of spring 17, that is the pressure of the pressure medium on the activating side of the apparatus is completely compensated for by the pressure on the release side. If the force effective on rod 22 has the value of 300 N, then a change of the direction of the moment of brake drum 10 will cause, for the given values of the contact arc and coefficient of friction, a change of force on tripping pin 25 of from 600 N to 750 N or vice versa. As long as the biasing force of spring 28 is so chosen that the threshold of switch 26 is somewhere within this force range, the switch will respond to this change in direction of torque. Since, in the exemplary embodiment, the switch has a threshold of 300 N, it will be noted that the switch will change state, therefore furnishing the required signal, even when the force applied by rod 22 onto the brake band has not as yet decreased to the value of 300 N but is still somewhat higher.

FIG. 4c, illustrating upshift while coasting, is included for completeness, but requires no further discussion in relation to the present invention.

As is illustrated in FIG. 4d, in a downshift during coasting the clutch is released slowly, while a hydraulic coupling of the release side of activating apparatus 15 and the activating side of clutch 9 causes a simultaneous corresponding increase in the braking moment, as is desirable to achieve a jolt-free shift.

Under certain conditions, as illustrated in FIGS. 4a–4d, changes in speed of particular elements of the transmission may occur even after complete engagement of the clutch or the brake. This results from the fact that braking of relatively large means as are coupled to the transmission cannot take place instantaneously even with full engagement of the clutch or of the brake band.

For a transmission of the above-described type, approximately 30 to 100 ms, (typically 50 ms) are required between the time of starting the decrease in the braking torque and the freewheel point (FIG. 4a). The time gaps in which neither the coupling nor the brake is engaged (FIG. 4b) are typically of a duration of approximately 30 to 500 ms.

Various changes and modifications may be made within the scope of the inventive concepts.

We claim:

1. In an automatic transmission having planetary gearing having a drive member (1), a driven member (2), a first intermediate member (3), means including a hydraulically operated clutch (9) for coupling said drive member, said driven member and said first intermediate member so as to prevent relative rotation therebetween, means comprising a brake band (4) having a first and a second end coupling at its respective ends and disposed for applying a brake force to said first intermediate member and also comprising a hydraulic piston (16) for applying brake force to said first end coupling in response to the difference in pressures of a pressure medium respectively applied at an actuating side and at a release side thereof, means (18,20) for applying hydraulic fluid to said activating and release sides of said piston, a gear box (5) for housing said transmission, and sensor means (26) braced against said transmission and against said second end coupling of said brake band (4) for receiving a reactive force varying in dependence upon said brake force and the direction of rotation of said first intermediate member and for furnishing a threshold signal when said reactive force passes a threshold value, said sensor means (26) including an electrical switch having first and second states respectively when said reactive force is less than and greater than said threshold value, and wherein said clutch means is disengaged and said brake band applies a maximum brake force to said first intermediate member creating a reactive force substantially exceeding said threshold value when said transmission is in a first gear and said brake band applies a minimum force to said first intermediate member when said transmission is in a second gear:

apparatus for generating a freewheel signal when the torque exerted by said first intermediate member is approximately equal to zero during shift in either direction between said first and second gear, comprising regulator means (32,34) for applying hydralic fluid simultaneously to said release side of said piston (16) and to said hydraulic clutch (9) for engaging said clutch at a predetermined rate, thereby decreasing said torque of said first intermediate member, and for simultaneously decreasing said brake force applied to said first intermediate member while maintaining sufficient brake force to prevent rotation of the latter and at a rate decreasing said brake force at a sufficient rate to enable said sensor means to furnish said threshold signal in response to a change of direction of said torque of said first intermediate member, whereby said threshold signal constitutes said freewheel signal.

* * * * *